May 6, 1924.

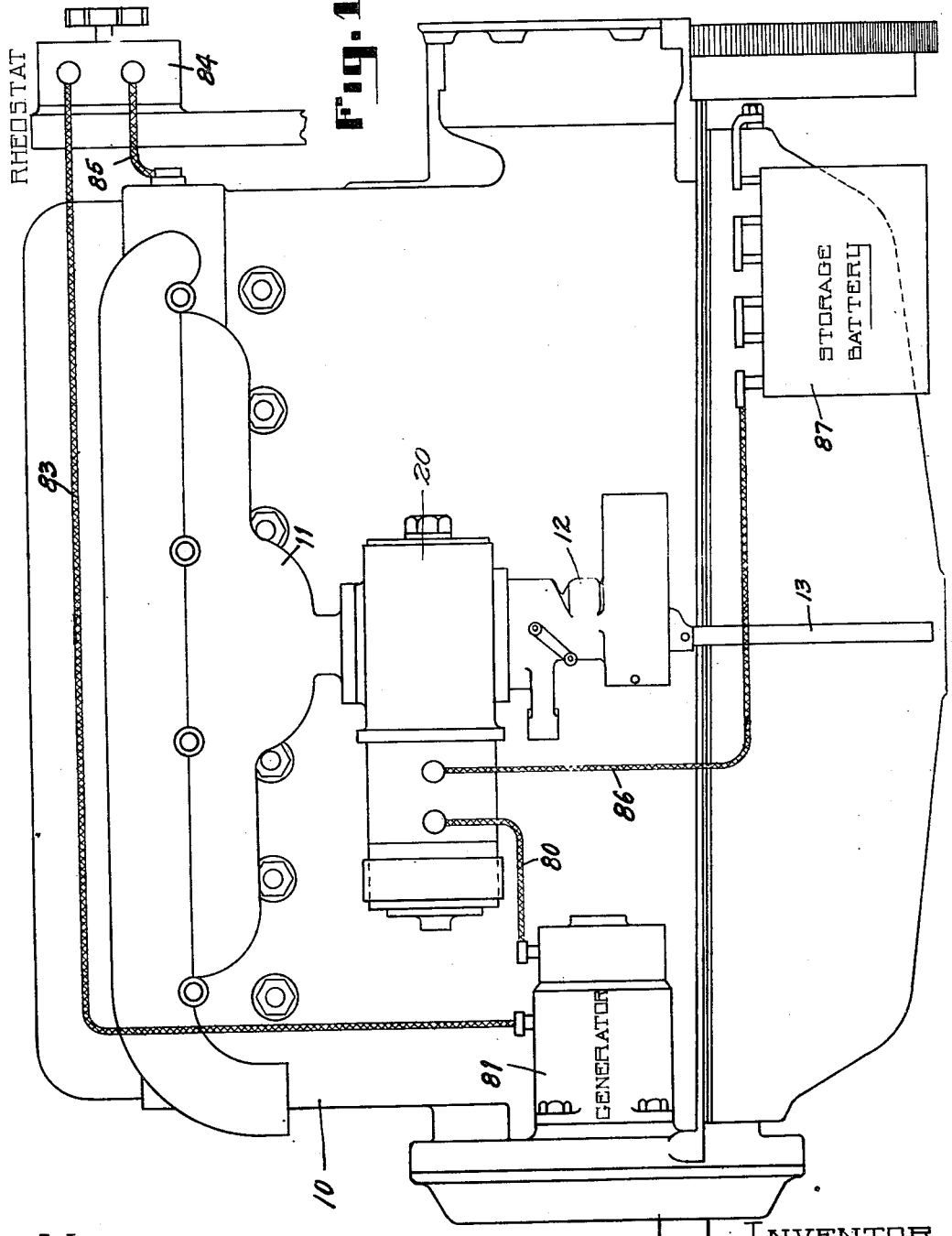

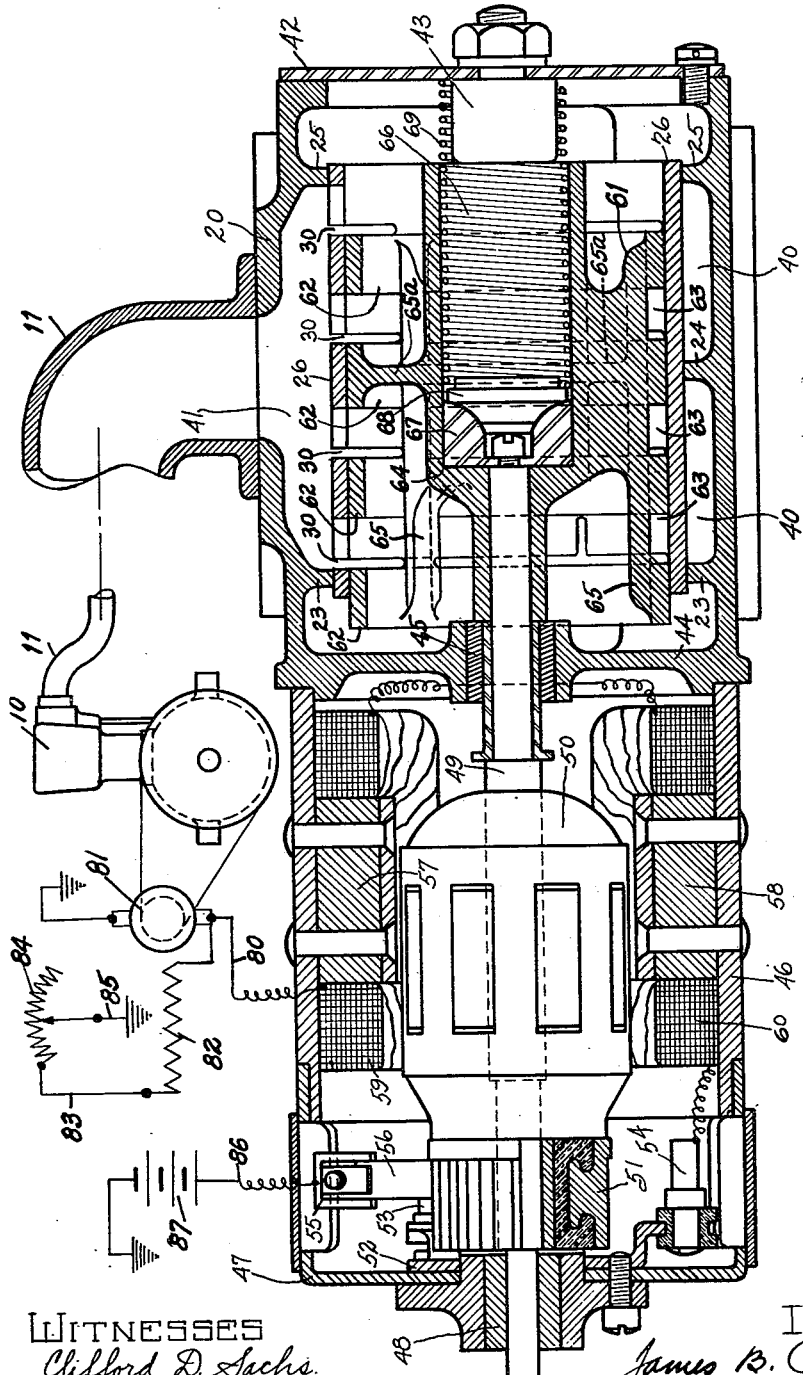

J. B. REPLOGLE

ENGINE GOVERNOR

Filed April 15, 1919    4 Sheets-Sheet 3

1,493,281

May 6, 1924.
J. B. REPLOGLE
ENGINE GOVERNOR
Filed April 15, 1919   4 Sheets-Sheet 4
1,493,281
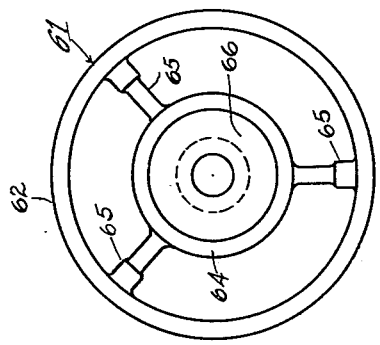
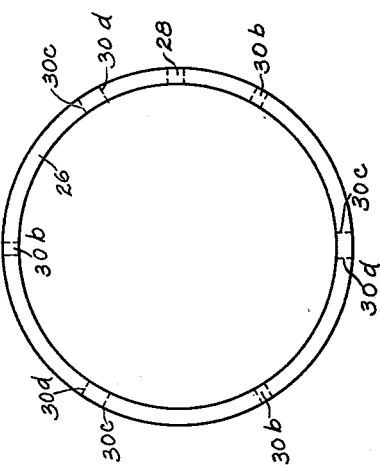
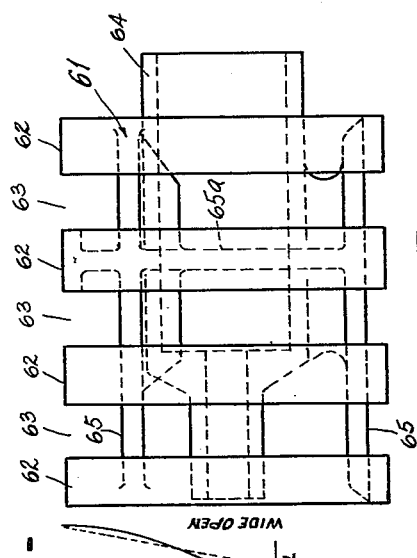
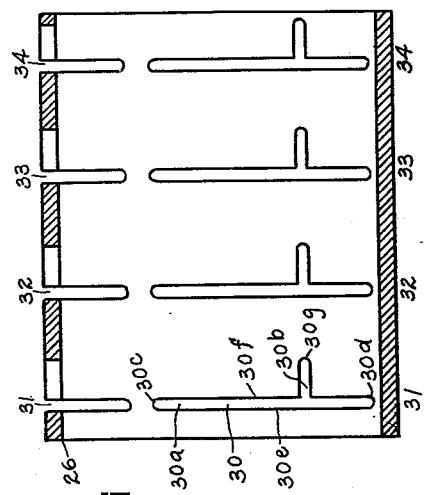
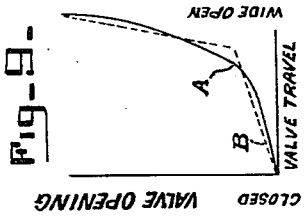
WITNESSES
Clifford D. Sachs
Walter W. Riedel
INVENTORS
James B. Replogle
Kerr, Page, Cooper & Hayward
ATTORNEYS Patented May 6, 1924.

1,493,281

UNITED STATES PATENT OFFICE.

JAMES B. REPLOGLE, OF DETROIT, MICHIGAN, ASSIGNOR TO THE REMY ELECTRIC COMPANY, A CORPORATION OF INDIANA.

ENGINE GOVERNOR.

Application filed April 15, 1919. Serial No. 290,192.

*To all whom it may concern:*

Be it known that I, JAMES B. REPLOGLE, a citizen of the United States of America, residing at Detroit, county of Wayne, State of Michigan, have invented certain new and useful Improvements in Engine Governors, of which the following is a full, clear, and exact description.

This invention relates to throttle governors for controlling the speed of internal-combustion engines.

One of the objects of the invention is to prevent "hunting" between the operation of the governor and the resulting operation of the engine, or in other words, it is an object to establish equilibrium between the governor and engine with the least possible delay, whatever may be the change in load or speed of the engine. For example, it is an aim of the invention to move the throttle valve in accordance with variations in speed of the engine, in order to admit the required amount of power medium, and no more than is necessary, to meet the requirements of load and speed.

In carrying out this aim of the invention I provide certain improvements in the throttle governor, described in my copending application, Serial No. 262,010 and filed November 11, 1918.

Other and further objects and advantages of the present invention will be apparent from the following description, reference being had to the accompanying drawings wherein one preferred embodiment of the invention is clearly shown.

In the drawings:—

Fig. 1 is a side elevation of an engine to which the present invention is applied;

Fig. 1ª is a longitudinal sectional view of the throttle governor embodying the present invention, together with a wiring diagram and a diagrammatic illustration of an engine;

Fig. 4 is a longitudinal sectional view of the valve seat;

Fig. 5 is an end view thereof;

Fig. 6 is a modified form of the valve port;

Fig. 7 is a side view of the valve; and

Fig. 8 is an end view thereof.

Fig. 9 is a graphic showing of the relation of valve travel to valve opening with the use of valve ports of the type shown in Figs. 4 and 6.

Figure 2:
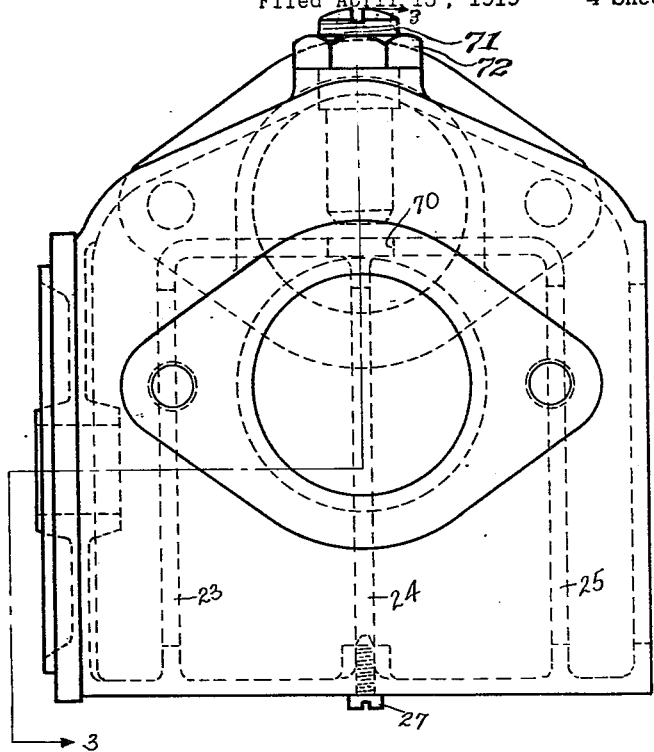
Fig. 2 is a plan view of the valve casing.
Figure 3:
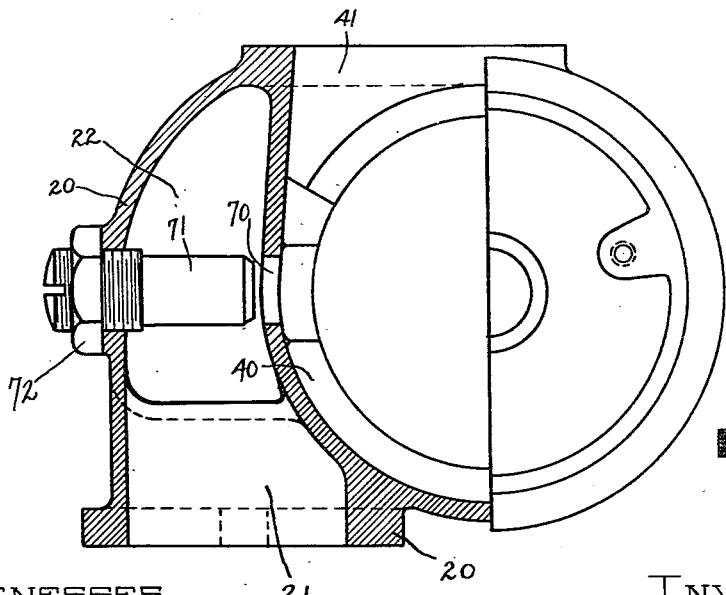
Fig. 3 is a view taken on the line 3—3 of Fig. 2.

In Fig. 1 is shown an internal combustion engine 10 having an intake 11 and a carburetor 12 connected with a fuel supply by pipe 13. Between intake 11 and carburetor 12, the valve casing 20 of the engine governor is located. Casing 20 is provided with an inlet passage 21 communicating with the carburetor 12. Inlet passage 21 is connected by a horizontal passage 22 which conducts the power fluid in opposite directions to the ends of the casing. Extending from the interior of the cylindrical wall of the casing 21 are three annular flanges or ribs 23, 24 and 25, which support a valve seat 26 which is shown in detail in Figs. 4 and 5. A screw 27 passing through casing 20 projects into a hole 28 formed in said valve seat 26, for the purpose of securing said seat in position within the casing, while permitting expansion of said valve relatively to said casing.

Valve seat 26 is provided with a plurality of T-shaped ports 30 arranged in circular rows. In the valve seat shown in the drawings there are four rows 31, 32, 33 and 34, each row having three of such ports. Each port 30 comprises intersecting slots 30ª and 30ᵇ, slot 30ª extending from point 30ᶜ to point 30ᵈ and having a width included between the lines 30ᵉ and 30ᶠ. The slot 30ᵇ is formed at right angles with the slot 30ª and extends from the line 30ᶠ to a point 30ᵍ.

An annular passage 40 is formed between the casing 20 and valve seat 26, and this passage 40 leads to an outlet passage 41 which is adapted to be connected with the intake pipe 11 of an engine 10, shown diagrammatically in Fig 1ª.

One end of casing 20 is provided with a cover-plate 42 which supports a stud 43, for a purpose to be described, and the other end of casing 20 is enclosed by an end-wall 44 which supports a bearing 45 and a motor-field shell 46.

Shell 46 supports a commutator housing 47 which carries a bearing 48. Within bearings 45 and 48 is journalled an armature shaft 49, which carries motor armature 50 and commutator 51. Commutator housing 47 supports a bracket 52 carrying studs 53 and 54, upon which are mounted arms carrying brushes, one of which is shown at 55 carrying a brush 56. Field shell 46 supports pole pieces 57 and 58, upon which are mounted the motor-field windings 59 and 60, respectively.

Motor field windings 59 and 60 are connected in series with brush 56 and the brush (not shown) supported by stud 54. Winding 59 is connected by wire 80 with a generator 81 which is driven by engine 10, upon which said generator is grounded. One terminal of the generator field 82 is connected by wire 83 with a rehostat 84 which is grounded on the engine 10 by wire 85. Motor brush 56 is connected by wire 86 with storage battery 87 which is grounded upon the engine 10. By means of these connections the motor field excitation will increase upon an increase in engine speed. The relation of motor field excitation to engine speed can be varied by means of the rheostat in the generator field circuit.

Shaft 49 is connected with valve 61, which is supported so as to slide within the valve seat 26. Valve 61 comprises a plurality of bands 62 held apart to provide ports 63 by webs 65 which connect said bands together with a centrally disposed hub portion 64, by means of which the bands 62 are supported upon shaft 49. One of the bands 62 is connected with hub 64 also by means of a partition 65ª. Ports 63 are so spaced that in the full-open position of the valve 61, they will be opposite the ports 30 in the valve seat 26. The bands 62 are made wider than ports 63 in order to sufficiently overlap the valve and port when the valve is in closed position.

The hub 64 of valve 61 is centrally bored at 66 to receive a bearing 67, a bearing 68 of graphite or similar material, and a spring 69 which is interposed between bearing 68 and the cover-plate 42. Stud 43 retains spring 69 in position. Normally the spring 69 maintains the valve 61 in full-open position, as shown in Fig. 1ª, in which position the armature 50 will be held in non-symmetrical relation with respect to the pole pieces 57 and 58.

The operation of the invention is as follows:—

When the engine is at rest, the valve 61 and parts associated therewith will occupy the position shown in Fig. 1ª, as has been previously explained. With the valve in this position the power fluid may pass freely to the engine through the ports 30 in the valve seat 26. When a predetermined engine speed has been attained, the magnetic attraction of the motor field upon the armature 50 will be sufficient to overcome spring 69 and to cause the longitudinal attraction of armature 50, and the movement of valve 61 to the right, as viewed in Fig. 1ª. This movement will tend to close the ports 30 and consequently reduce the speed of the engine, whereupon the current generated will tend to fall off and the intensity of the motor field will tend to be reduced. At a predetermined speed of the engine a balance will be established between the forces causing the attraction of the armature 50 and the opposing forces exerted by the spring 69, with the result that the valve 61 will be held in a position such as to limit the speed of the engine to a predetermined maximum value. These longitudinal movements of shaft 49 are facilitated by the rotation of the armature 50 which cooperates with the motor field in the usual manner, so as to produce rotation. By rotating the shaft 49 during its longitudinal movement, friction retarding endwise movement of the shaft is taken up by shaft rotation so that the governing action can take place as if no friction were present to hinder endwise movement of the shaft. This function of the motor in producing rotation as well as longitudinal governing motion of the armature shaft has been described in detail in my copending application previously referred to.

In my copending application, Serial No. 262,010, referred to, the governor valve was so constructed that the area of port opening changed in direct proportion to the endwise movements of the valve shaft. A dash pot was provided which tended to eliminate hunting, that is, the overtravel of the valve shaft in its endeavor to establish itself in a position of equilibrium.

I have discovered that hunting can be practically eliminated by constructing the governor valve so that power fluid will be admitted to the engine in such a manner that torque developed by the engine varies in direct proportion to the movement of the valve shaft. It has been found that the ratio of valve movement to port opening will be more or less a variable depending on the type of engine. This ratio may vary according to some well defined law. For four-stroke cycle internal-combustion engines the curve which represents variations in the ratio in valve opening to endwise movement of the valve will approximate a versine curve. For the greater part of movement of the valve from closed toward open position the area of port opening will increase relatively slowly. Then along toward the end of the travel of the valve toward open position the ratio of the area of port opening to valve travel will be relatively very much greater. In certain internal-combustion engines, for example, it has been found that the engine may be brought up to about 75 or 80 per cent full load by opening the throttle to an extent which is relatively small as compared with the extent to which the throttle must be opened in order to bring the engine from 75 to 80 per cent load up to full load.

A valve port which provides that the ratio of port opening to valve movement shall vary in accordance with a versine curve is shown in Fig. 6. The valve port slot 30$^b$ is uncovered first by the valve, and as the valve moves further to open position the slot 30$^a$ is uncovered. It will be noted that the slot 30$^b$ widens out gradually into the slot 30$^a$. Such a port opening as is shown in Fig. 6 is intended to provide for the admission of power fluid to the engine in such a manner that the ratio of valve travel to engine torque shall be practically constant. It is apparent therefore that the relatively small port opening 30$^b$ provides for the admission of the power fluid which will bring the engine up to about 70 per cent full load, but in order to bring the engine up to full load the port opening must be increased at a much greater rate and this is accomplished by uncovering the port portion 30$^a$.

While the port shown in Fig. 6 may be what is theoretically required, satisfactory results can be obtained with the valve port constructed as shown in Fig. 4, in which the slot 30$^b$ is uniform in width, so that when slot 30$^a$ is uncovered by the valve there is an abrupt change in the ratio of port opening to valve movement. For manufacturing reasons the valve port shown in Fig. 4, may be desirable. In Fig. 9, curve A is characteristic of the relation of valve travel to valve opening which is inherent in a governor employing valve ports such as shown in Fig. 6. Curve B is characteristic of this relation inherent in a governor employing valve ports such as shown in Fig. 4. It is apparent how the valve ports of Fig. 4 can approximately produce the results of the valve ports in Fig. 6. Except for a relatively small portion of the valve travel curve B closely proximates curve A. Hence for practical use the ports of the type shown in Fig. 4 have been found satisfactory. Both ports are T-shaped, the only difference being that the stem portion 30$^b$ of the T in Fig. 6 gradually merges into the cross portion 30$^a$.

It is to be understood that my invention is not limited to the valve ports shown in the drawings but my invention contemplates the construction of the valve port to suit the particular type of engine so that the valve travel will be in direct proportion to the torque produced by the engine.

The operation of the engine can be understood more clearly by considering the operation of the governor shown and described herein.

Assuming that the engine is running at the maximum speed, and at pratically no load, it is evident that the openings 30 will be practically closed, as very little power fluid would be consumed by the engine. All the power fluid needed by the engine while idling may pass through a by-pass orifice 70 connecting the passage 22 directly with the passage 40, so that the power fluid may go directly from the passage 22 to the outlet passage 41. The flow of power fluid through this passage 70 is regulated by means of a screw 71, having threaded engagement with the casing 20 and located in adjusted position by means of a lock nut 72.

If a load is placed upon the engine, its speed will be reduced resulting in less current being delivered to the throttle governor by the generator driven by the engine. The magnetic attraction upon the armature 50 will be reduced and spring 69 will move valve 61 to the left, or toward its open position shown in Fig. 1$^a$. This movement of valve 61 will effect the uncovering first of the slots 30$^b$ of ports 30, so that at first the per cent of area of valve opening is small relatively to the per cent of travel of the valve toward the open position. With a valve and valve seat constructed as shown in the drawings, the valve 61 will have travelled approximately 80 per cent of its full travel toward open position before said valve begins to uncover the slots 30$^a$ of ports 30. Then during approximately the last 20 per cent of travel of valve 61 to full-open position, the slot portions 30$^a$ will be uncovered, with the result that the ratio of per cent of port opening to the per cent of valve travel is now much greater than during the first 80 per cent of movement of valve 61 toward open position.

Where the valve ports 30 are formed in the manner described it has been found that the hunting action between the controlling movements of the throttle governor and the resulting operating of the engine has been substantially eliminated.

If a throttle valve for an internal-combustion engine be constructed so that the ratio of valve opening to valve travel is constant, the torque of the engine will increase nearly to the maximum value during the first 15 or 20 per cent of travel of the valve toward open position. Under such conditions, and assuming that the engine has been idling, if, for example, a 50 per cent load is placed on the engine, the speed will fall off very suddenly, permitting the energy which has been stored in the spring to be suddenly released causing the valve to be moved toward open position much farther than is necessary to admit the required amount of power fluid to the engine to meet the load placed upon it. Under these conditions the result would be that, while the engine is carrying only 50 per cent load, for example, there will be enough power fluid admitted to the engine to take care of a much greater load. Since the torque is not great enough to absorb all of the power developed by the engine, the engine speed will greatly increase. This increase in speed will tend to effect the closing of the valve in the manner described, but to such a degree that there will not be sufficient power fluid admitted to the engine to take care of the load. This overthrowing action of the valve in both directions will be repeated almost indefinitely so that at no time scarcely is a balance established by the throttle governor.

I have found that with a throttle governor constructed in accordance with the present invention the load carried by the engine will be approximately 50 per cent full load when the valve is moved to its mid-travel position, and the engine will carry full load only when the valve has completed its movement to full open position. Then if the load is suddenly reduced to 50 per cent load, for example, the valve will move back to its mid-travel position with substantially no tendency to overthrow.

It is thought that where the governor valve is constructed that engine torque developed bears a constant ratio to valve travel, the sensitiveness of the governor is equally distributed over its range of movement, that is, the governor is equally sensitive at different positions of the valve. This feature is believed to be advantageous in governors where the range of valve travel is relatively limited as it often may be in speed responsive devices which are either controlled directly by centrifugal force or in accordance with voltage developed by a dynamo driven by the engine.

While the throttle governor shown and described is particularly adapted to certain types of internal-combustion engines, it is to be understood that the invention is applicable as well to other types of internal-combustion engines. It is to be understood that this invention contemplates making such changes in construction as are necessary to meet the requirements of a particular type of engine, in order that the "hunting" action referred to will be eliminated.

While the form of mechanism herein shown and described, constitutes a preferred form of embodiment of the invention, it is to be understood that other forms might be adopted, all coming within the scope of the claims which follow.

I claim:

1. In a governor for internal-combustion engines, the combination with a movable speed responsive element; of means operated by said element for controlling the admission of power fluid to the engine, said means having provisions whereby the relation of the power produced through the admission of power fluid to the engine to the movement of said speed responsive element is substantially constant within the limits of travel of said element.

2. In a governor for internal-combustion engines, the combination with a movable speed responsive element; of a valve actuated by said element; a seat for the valve, said seat and valve having provisions for controlling the admission of power fluid to the engine in a manner such that the relation of the power produced by said admission to the movements of said speed responsive element is substantially constant within the limits of travel of said element.

3. In a governor for internal-combustion engines, the combination with a movable speed responsive element; of a valve actuated by said element; and a seat for the valve, said seat having port provisions arranged to be opened by said valve in a manner such that the relation of the power produced through the issue of fluid through the port opening to the movement of the said speed responsive element is substantially constant within the limits of travel of said element.

4. In a governor for internal-combustion engines, the combination with a speed responsive element capable of imparting rotary and linear motion; of a valve arranged to be rotated by said element, and moved longitudinally thereby, to control the admission of power fluid to the engine; a seat for the valve, said seat and valve having provisions whereby the relation of the power produced by said admission to the linear movement of said speed responsive element is substantially constant within the limits of travel of said element.

5. In a governor for internal-combustion engines, the combination with a valve member mounted for rotary and linear movement; of means for rotating said valve member and for moving said valve member endwise in response to engine speed; and a port member, said members providing for the continuous passage of power medium when the valve has been moved endwise to open position, and providing for the flow of power medium such that the relation of the power produced through the admission of power medium to the engine to the endwise movement of said valve is substantially constant within the limits of endwise movement of said valve.

6. In a governor for internal-combustion engines, the combination with a valve including a band mounted for rotary and linear movement; of means for rotating said band and for moving said band axially in response to engine speed; and a port member having an opening cooperating with said band, said opening being formed and arranged to permit the flow of power medium to the engine such that the relation of power produced through the admission of power medium to the engine to the axial movement of said band is substantially constant within the limits of axial movement of said band.

7. In a governor for internal-combustion engines, the combination with a valve including a plurality of bands spaced to provide continuous annular ports, and mounted for rotary and linear movement; of means for rotating said valve and for moving said valve axially in response to engine speed; and a port member having a plurality of spaced openings formed and arranged to be uncovered by said valve bands so that the relation of power produced through the admission of power medium to the engine to the axial movement of said valve is substantially constant within the limits of axial movement of said valve.

8. In a governor for internal-combustion engines, the combination with a speed responsive device; of a valve controlled thereby; and a seat for said valve, said valve and seat having port provisions such that the curve representing the ratio of port opening to valve travel being relatively gradual over the greater portion of valve travel to opening position and then relatively steep over the remaining smaller portion of valve travel.

9. In a governor for internal-combustion engines, the combination with a speed responsive device; of a valve controlled thereby; a seat for said valve, said valve and seat having port provisions such that as the valve is opened the ratio of port opening to valve travel is relatively small for the larger portion of the movement of said valve to full open position, and then the said ratio is relatively great as the valve moves further to open position.

10. In a governor for internal-combustion engines, the combination with a speed responsive device; of a valve controlled thereby; a seat for said valve, said valve and seat having port provisions such that the ratio of port opening to valve travel varies substantially according to the versine curve.

11. In a governor for internal-combustion engines, the combination with a speed responsive device; of a valve member controlled thereby; a seat member for said valve; one of said members having a T-shaped port opened by movement of the valve along the stem of the T.

12. In a governor for internal-combustion engines, the combination with a speed responsive device; of a valve seat having a T-shaped port; and a valve actuated by said device and having a port closing portion adapted to open or close said port by a movement of the valve along the stem of the T.

13. In a governor for engines, the combination with a valve frame providing a power fluid passage; of a cylindrical valve seat mounted within said frame extending across the passage and provided with ports grouped in spaced annular rows; a motor field frame secured to the valve frame; an end frame secured to the field frame; an armature shaft journalled in the end frame and valve frame; an armature mounted on said shaft; a valve mounted on the shaft and rotatable and endwise movable within said seat, and including a plurality of bands located in spaced relation and cooperating with said ports; and means tending to keep the armature in nonsymmetrical relation with the field.

14. In a governor for engines, the combination with a valve frame providing a power fluid passage; of a cylindrical valve seat supported by said frame and extending across said passage and provided with ports grouped in spaced annular rows; a valve supported for rotary and axial movement by said frame and including a plurality of annular bands located in spaced relation and cooperating with said ports; and means for rotating and axially moving said valve.

In testimony whereof I affix my signature.

JAMES B. REPLOGLE.

Witnesses:
L. L. HOSIER,
FRANK L. WURL.